(12) United States Patent
Wallack

(10) Patent No.: US 6,728,582 B1
(45) Date of Patent: Apr. 27, 2004

(54) SYSTEM AND METHOD FOR DETERMINING THE POSITION OF AN OBJECT IN THREE DIMENSIONS USING A MACHINE VISION SYSTEM WITH TWO CAMERAS

(75) Inventor: Aaron Wallack, Natick, MA (US)

(73) Assignee: Cognex Corporation, Natick, MA (US)

( * ) Notice: Subject to any disclaimer, the term of this patent is extended or adjusted under 35 U.S.C. 154(b) by 572 days.

(21) Appl. No.: 09/738,957

(22) Filed: Dec. 15, 2000

(51) Int. Cl.$^7$ ............................................. G05B 19/18
(52) U.S. Cl. ......................... 700/64; 700/47; 700/56; 700/58; 700/61; 700/66; 700/118; 700/163; 700/186; 700/187; 382/154; 382/153; 382/159; 382/181
(58) Field of Search ............................. 700/47, 56, 58, 700/61, 64, 66, 118, 163, 186–187; 382/154, 153, 159, 181

(56) References Cited

U.S. PATENT DOCUMENTS

| | | | |
|---|---|---|---|
| 6,137,893 A | 10/2000 | Michael et al. | 382/103 |
| 6,173,070 B1 | 1/2001 | Michael et al. | 382/145 |
| 6,181,343 B1 * | 1/2001 | Lyons | 345/850 |
| 6,226,388 B1 * | 5/2001 | Qian et al. | 382/103 |
| 6,226,418 B1 * | 5/2001 | Miller et al. | 382/294 |
| 6,393,143 B1 * | 5/2002 | Pipitone | 382/154 |

OTHER PUBLICATIONS

U.S. patent application Ser. No. 09/738,564, Wallack, filed Dec. 15, 2000.
U.S. patent application Ser. No. 09/738,941, Wallack, filed Dec. 15, 2000.
U.S. patent application Ser. No. 09/738,563, Wallack, filed Dec. 15, 2000.
U.S. patent application Ser. No. 09/737,836, Wallack, filed Dec. 15, 2000.
"A Tutorial on Visual Servo Control" Seth Hutchinson, Greg Hager and Peter Corke, May 14, 1996; 42 pages.

* cited by examiner

Primary Examiner—Ramesh Patel
Assistant Examiner—Thomas Pham
(74) Attorney, Agent, or Firm—William Loginov

(57) ABSTRACT

A system and method for estimating the position of an object in three dimensions uses two cameras interconnected with a machine vision search tool. The search tool is capable of registering transformation of a pattern in at least two translational degrees of freedom, along the image plane, and at least one non-translational degree of freedom along a camera axis perpendicular to the image plane. The tool can be a rotation/scale-invariant (RSIS) search tool. A nominal position for each camera's acquired image of the object is determined and a set of uncertainty vectors along each of the degrees of freedom is generated. The vectors are weighted, with the respective vectors along the camera axis being weighted more-highly than orthonormal vectors within the image plane. The weighted vectors are combined to define an error. The defined error is compared according to a least squares technique with selected three-dimensional position estimates and the minimum sum error is used to identify the best three-dimensional position estimate.

14 Claims, 4 Drawing Sheets

SYSTEM AND METHOD FOR DETERMINING THE POSITION OF AN OBJECT IN THREE DIMENSIONS USING A MACHINE VISION SYSTEM WITH TWO CAMERAS

RELATED APPLICATION

This application is related to commonly owned U.S. patent application Ser. No. 09/738,564, filed on Dec. 15, 2000, filed on even date herewith, entitled SYSTEM AND METHOD FOR LOCATING AN OBJECT IN THREE DIMENSIONS BASED UPON REGISTERING MULTIPLE PATTERNS USING MACHINE VISION by Aaron S. Wallack, and expressly incorporated herein by reference.

BACKGROUND OF THE INVENTION

1. Field of the Invention

This invention relates to machine vision systems and more particularly to uses for advanced machine vision search tools that register patterns transformed by at least two translational and at least one non-translational degree of freedom.

2. Background Information

The use of advanced machine vision systems and their underlying software is increasingly employed in a variety of manufacturing and quality control processes. Machine vision enables quicker, more accurate and repeatable results to be obtained in the production of both mass-produced and custom products. Basic machine vision systems include one or more cameras (typically having solid-state charge couple device (CCD) imaging elements) directed at an area of interest, frame grabber/image processing elements that capture and transmit CCD images, a computer and display for running the machine vision software application and manipulating the captured images, and appropriate illumination on the area of interest.

Many applications of machine vision involve the inspection of components and surfaces for defects that affect quality. Where sufficiently serious defects are noted, a part of the surface is marked as unacceptable/defective. Machine vision has also been employed in varying degrees to assist in manipulating manufacturing engines in the performance of specific tasks. One task using machine vision is visual servoing of robots in which a robot end effector is guided to a target using a machine vision feedback. Other applications also employ machine vision to locate a stationary and/or moving pattern.

The advent of increasingly faster and higher-performance computers, has enabled the development of machine vision systems that employ powerful search tools. Such search tools enable a previously trained/stored image pattern to be acquired and registered/identified regardless of its viewed position. In particular, existing commercially available search tools can register such patterns transformed by at least three degrees of freedom, including two translational degrees (x and y-axis image plane) and a non-translational degree (rotation and/or scale, for example). One particular implementation of an advanced search tool is the rotation/scale-invariant search (RSIS) tool. This tool registers an image transformed by at least four degrees of freedom including the two translational degrees (x and y-axis image plane) and at least two non-translational degrees (z-axis (scale) and rotation within the x-y plane about an axis perpendicular to the plane). Some tools also register more complex transformations such as aspect ratio (rotation out of the plane whereby size on one axis decreases while size in the transverse axis thereto remains the same). These search tools, therefore, enable a specific pattern within the field of view to be located within a camera field of view to be positively identified and located accurately within the vision system's internal reference system (an x, y, z, rotation coordinate system, for example). The RSIS and other advanced search tools particularly allow for the identification and acquisition of patterns having somewhat arbitrary rotation, scaling (e.g. distancing) and translation with respect to the reference system. In other words, the tool is sufficiently robust to recognize a desired pattern even if it is rotated and larger/smaller/skewed relative to a "model" or trained pattern within the vision system. In addition advanced search tools are capable of tolerating a reasonable degree of occlusion and contrast/illumination changes in the viewed pattern while still properly registering the pattern.

In general, advanced machine vision tools acquire an image of an object via a camera and analyze the outline or a particular part of the object, such as a predetermined fiducial mark or other pattern. The processing speed of the underlying computer in which the tool resides is sufficient to enable a very large number of real time calculations to be completed in a short time frame. This particularly enables the search tool to determine the coordinates within an image reference system for each analyzed point in the viewed area, and correlate these through repetition with a desired pattern. The search tool may map the locations of various points in the captured image to stored points in the model image. A pattern is registered if the mapping falls within accepted tolerances and parameters. Using various decision algorithms, the tool decides whether the viewed pattern, in a particular rotation and distance (scale) corresponds to the desired search pattern. If so, the tool confirms that the viewed pattern is, in fact, the pattern for which the tool is searching and fixes its position and orientation.

Machine vision systems having a three-degree-of-freedom, or greater, capability (such as RSIS) are available from a number of commercial vendors including Hexavision® from Adept Technology, Inc. of San Jose, Calif., and the popular Patmax® system from Cognex Corporation of Natick, Mass. Advanced machine vision search tools such as Patmax® also have the ability to take advantage of the previous known position of a search subject or target. This narrows the search area to positions relatively near the last known location. Therefore, searching is relatively faster on the next cycle since a smaller area is searched. In addition, these search tools can tolerate partial occlusion of a pattern and changes in its illumination, adding further to their robustness with respect to less advanced machine vision approaches.

One goal of machine vision is to provide a more accurate technique for estimating the position of an object in three dimensions. The z-axis(scale) registration function within an advanced search tool, while increasingly effective at defining the distance of an object along the camera axis, is typically less accurate than the corresponding registration functions within the translational degrees of freedom (x and y image plane). For example, the image position in the translational axes (x, y) is typically accurate to 1/40 of a pel. Conversely scale information derived by the search tool is typically accurate to no more than approximately 0.1% of total distance. This can be a large error where the optical range of the setup is large (i.e. for every one meter of camera standoff from the subject, error is greater than one millimeter). This error can be particularly significant in high-precision operations.

A variety of techniques are used for measuring the distance or range of a remote pattern or object. Triangulation is one accepted technique.

Accordingly, it is an object of this invention to provide a system and method for determining the three-dimensional position of an object accurately, effectively and rapidly using a machine vision system based upon principles of triangulation.

SUMMARY OF THE INVENTION

This invention overcomes the disadvantages of the prior art by providing a system and method for determining the three-dimensional position of an object using a machine vision system that correlates two separate camera images of the object, and derives a three-dimensional location thereof based upon triangulation upon the separate images. Each camera transmits captured image data to the machine vision system which includes an advanced machine vision search tool capable of registering each image transformed by at least two translational degrees of freedom (x and y-axis image plane) and at least one non-translational degree of freedom (z-axis(scale)) perpendicular to the image plane). By using at least two search tool results, derived from each of the respective cameras, and the transformation relating to the search tool results, three-dimensional position information on the viewed object is derived. The position information enables the system and method of this invention to thereby provide more-accurate three-dimensional position information on the underlying object.

In a preferred embodiment both cameras are spatially separated, typically on opposite sides of an area of interest and an angle thereto, the search tool is calibrated with respect to each camera's image using appropriate calibration techniques so that the image reference system for each camera is substantially the same, and the overall image reference system is known. The image of a trained pattern or "fiducial" is acquired by each camera, and provided to the machine vision system. The found position of the fiducial based upon each camera's acquired image of the fiducial is determined. This is the nominal position within the x, y and z coordinate system. The uncertainty along the image axis (z-axis) is determined, thereby enabling uncertainty positions along the z-axis to be computed. A direction unit vector IMAGERAY (wherein lower case letters refer to image positions and CAPITAL letters refer to three-dimensional positions) is derived for each camera view based upon the difference between z-axis uncertainty positions. Orthonormal unit vectors XDIR and YDIR along the two axes in the image plane, perpendicular to the image axis, are then derived for each camera view based upon the uncertainty. The direction unit vectors are then given various weights in which the weight for IMAGERAY is generally greater than that for XDIR and YDIR. An "error" for estimated three-dimensional position is determined for each camera by comparing a given estimate (X, Y, Z) to the weighted direction unit vectors and nominal positions according to least squares techniques. Selected estimates for three-dimensional position are applied to the defined "error." The selected estimate (X, Y, Z) that exhibits the minimum sum error is considered the best estimate for actual three-dimensional position of the pattern.

Note that the term "fiducial" will be used interchangably with "pattern" to identify a formation or design that is registered by the search tool. A fiducial is one type of pattern design that is registered.

In a preferred embodiment, the machine vision search tool employed is a rotation/scale-invariant search (RSIS) tool capable of registering transformation of a pattern by at least two translational and two non-translational degrees of freedom.

BRIEF DESCRIPTION OF THE DRAWINGS

The foregoing and other objects and advantages of the invention will become clearer with reference to the following detailed description as illustrated by the drawings, in which.

DETAILED DESCRIPTION OF AN ILLUSTRATIVE EMBODIMENT

Figure 1:
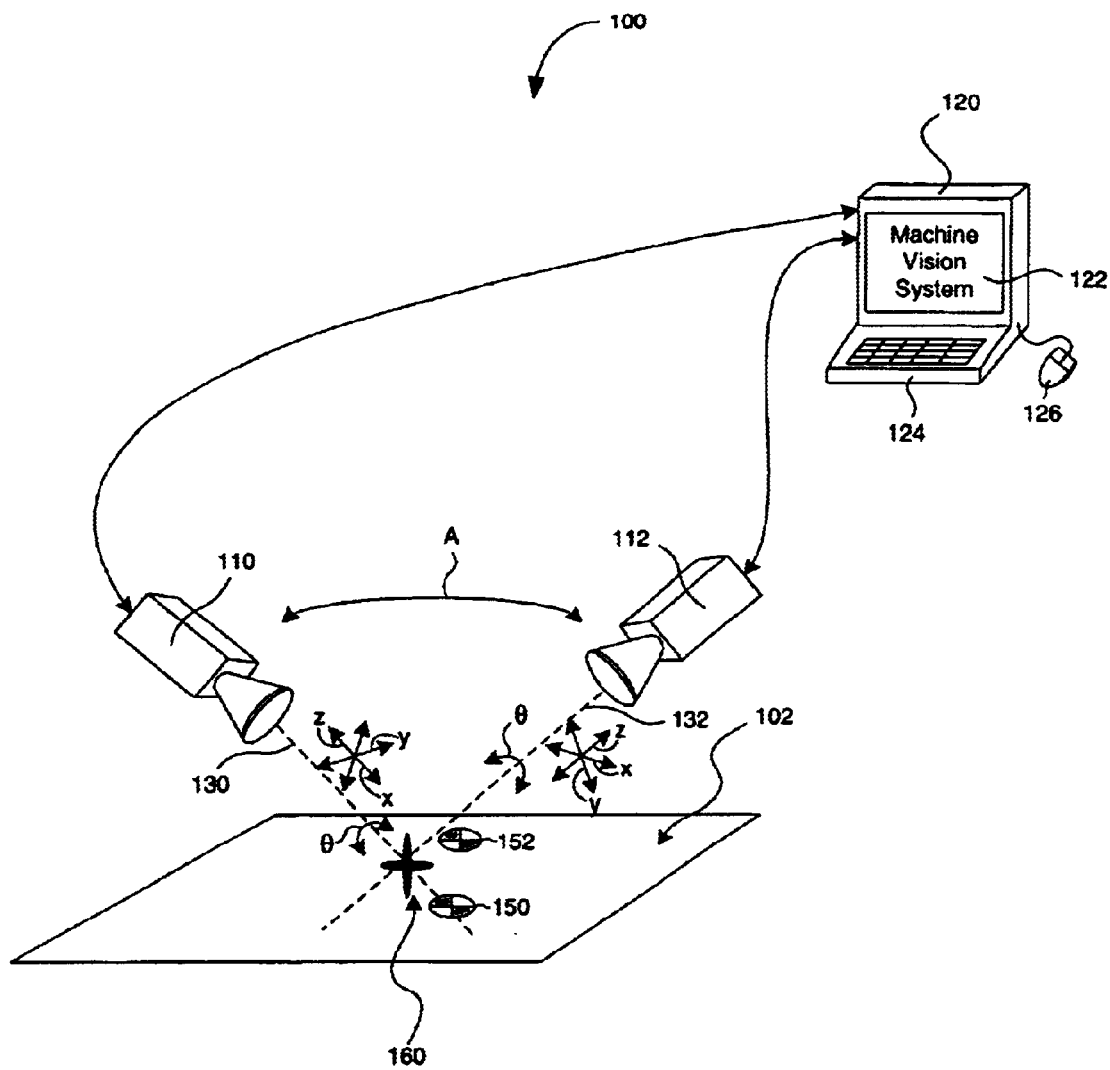
FIG. 1 is a schematic perspective view of a machine vision system having pair of cameras adapted for acquiring and triangulating image data according to this invention.

FIG. 1 shows a generalized setup 100 for determining the three-dimensional position of an object within an area of interest 102 using two or more camera assemblies 110 and 112. The camera assemblies include an imaging device such as a solid-state charge-couple device (CCD) and an appropriate image capture device/processor such as a frame-grabber. Each camera is interconnected with a computer system 120 having a display 122 and a graphical user interface manipulated by a keyboard 124, mouse and/or similar devices. Residing on the computer 120 is a machine vision system and related software as described further below. Note that the term "software," as used herein refers generally to any number of actions and data structures, whether implemented by a general-purpose processor or any an application-specific or custom processor (example— firmware). The cameras 110, 112 at opposite ends of the area of interest in this example, and are spaced apart at an angular spacing A. The cameras 110, 112 are generally focused toward a common point within the area of interest. A respective reference frame for each camera 110, 112 is shown in which the respective camera optical axis 130, 132 is defined as the z(scale) axis. The z-axis is representative of scale since translation of an image along the z-axis appears as a relative change in viewed image size rather than a defined coordinate translation. Similarly, any transformation of the image along orthogonal x and y-axes are viewed as a change in the relative location of the image within the applicable camera field of view. In addition, rotation about the respective camera axis 130, 132 (z(scale)-axis) is denoted as angular rotation ($\theta$). The degree of rotation ($\theta$) is accordingly viewed as a relative rotation in the viewed image pattern.

Each, camera transmits captured images within its field of view to a commercially available machine vision system capable of acquiring a respective image from each of at least two separate camera assemblies. The machine vision system according to this invention includes a search tool adapted to register a pattern, based upon a trained image thereof, transformed by at least three degrees of freedom—at least two translational degrees (x and y axes/plane) and at least one non-translational (preferably rotation θ in the x-y plane or z(scale)). As referenced above, one such search tool that registers transformation of an acquired image by at least four degrees of freedom including the two translational degrees (x, y) and two non-translational degrees (rotation θ and z(scale)) is the rotation/scale-invariant search (RSIS) tool such as the above-referenced Patmax®or Hexavision® system.

Note by "translational" it is meant, viewed linear displacement in an image plane clearly viewed by the camera, while "non-translational" means a change in the viewed image outside the parameters of the image plane such as general rotation of the image, change in size/scale due to movement toward and away from the camera, change in aspect ratio (rotation outside the image plane in one axis lying in the plane) and change in skew (simultaneous rotation outside the plane in two planar axes). In general, the search tool of the present embodiment is adapted to view the z(scale) axis as a non-translational degree of freedom.

Note that some commercially available search tools do not measure scale. Where such search tools are used in conjunction with the teachings of this invention, the returned scale is assumed to have a value of 1.0. Where the search tool measures x, y and θ, but not z(scale), the techniques to be described hereinbelow are modified to provide an extremely low error weighting (approaching or equaling zero) to the applicable measurements (see below).

In order to determine the three-dimensional location of an object, each camera is first trained to recognize a specific pattern that, according to this embodiment, defines a fiducial mark having a distinctive design and recognizable orientation. This fiducial is placed upon, or is part of the underlying object to be located by the system. The exemplary fiducial used herein is shown in the image reference frame view of FIG. 4 (described further below), and defines a circle 402 having alternating light and dark quadrants. However, any pattern which can be registered within the selected degrees of freedom can be used as a fiducial according to this invention. Other examples of fiducials can, therefore, include a unique object shape/outline, a logo on the object, or a particular structure/extension attached to the object.

Before discussing a general procedure for locating a trained pattern (fiducial), and hence the underlying object in three dimensions, a brief discussion of training and calibration of the machine vision system is provided. Both training and calibration are discussed in farther detail in commonly owned U.S. patent application Ser. No. 09/738,941, filed on Dec. 15, 2000, entitled SYSTEM AND METHOD FOR SERVOING ROBOTS USING FIDUCIAL MARKS AND MACHINE VISION by Aaron S. Wallack, the teachings of which are expressly incorporated herein by reference.

In summary, the system is first trained to recognize a particular fiducial or other pattern by capturing an image of the pattern with each camera and selecting a window that contains the pattern. The captured pattern is confirmed as a fiducial. The fiducial data can also be loaded from previously captured data as a file, or otherwise loaded into the machine vision search tool.

Calibration involves the moving of the fiducial along a plurality of degrees of freedom, generally corresponding with the degrees of freedom to be registered by the tool. (e.g. x, y, z(scale)). Rotation can also be calibrated where appropriate. The movement for each degree is known so that the resulting change in the image can be determined and mapped to the relative amount known movement. Alternatively, a calibration plate, or object that shows multiple fiducials at known spacings and orientations can be used.

According to one embodiment, the calibration of the search tool with respect to each of the applicable camera views can be accomplished using a three dimensional calibration object as taught in commonly owned U.S. patent application Ser. No. 09/738,563, filed on Dec. 15, 2000, entitled MACHINE VISION CALIBRATION OBJECT AND METHOD FOR CALIBRATING MACHINE VISION SYTEMS by Aaron S. Wallack, the teachings of which are expressly incorporated herein by reference.

Once the view from each camera is appropriately trained and calibrated, the location procedure can proceed. Referring to FIG. 1, the first camera 110 views a fiducial image 150 that is potentially displaced from the second camera's viewed fiducial 152 due to errors inherent in the approximation of the location of the fiducial in each camera view. This is because the z-axis is limited to a scale determination which, as described above, has reduced accuracy relative to the registration of the fiducial in the x and y axes. The star 160 represents the best estimate of the three-dimensional position of the fiducial. This best estimate assumes that the registered x and y-axis position is more accurate/trustworthy than the registered z(scale) position as discussed generally above.

Figure 2:
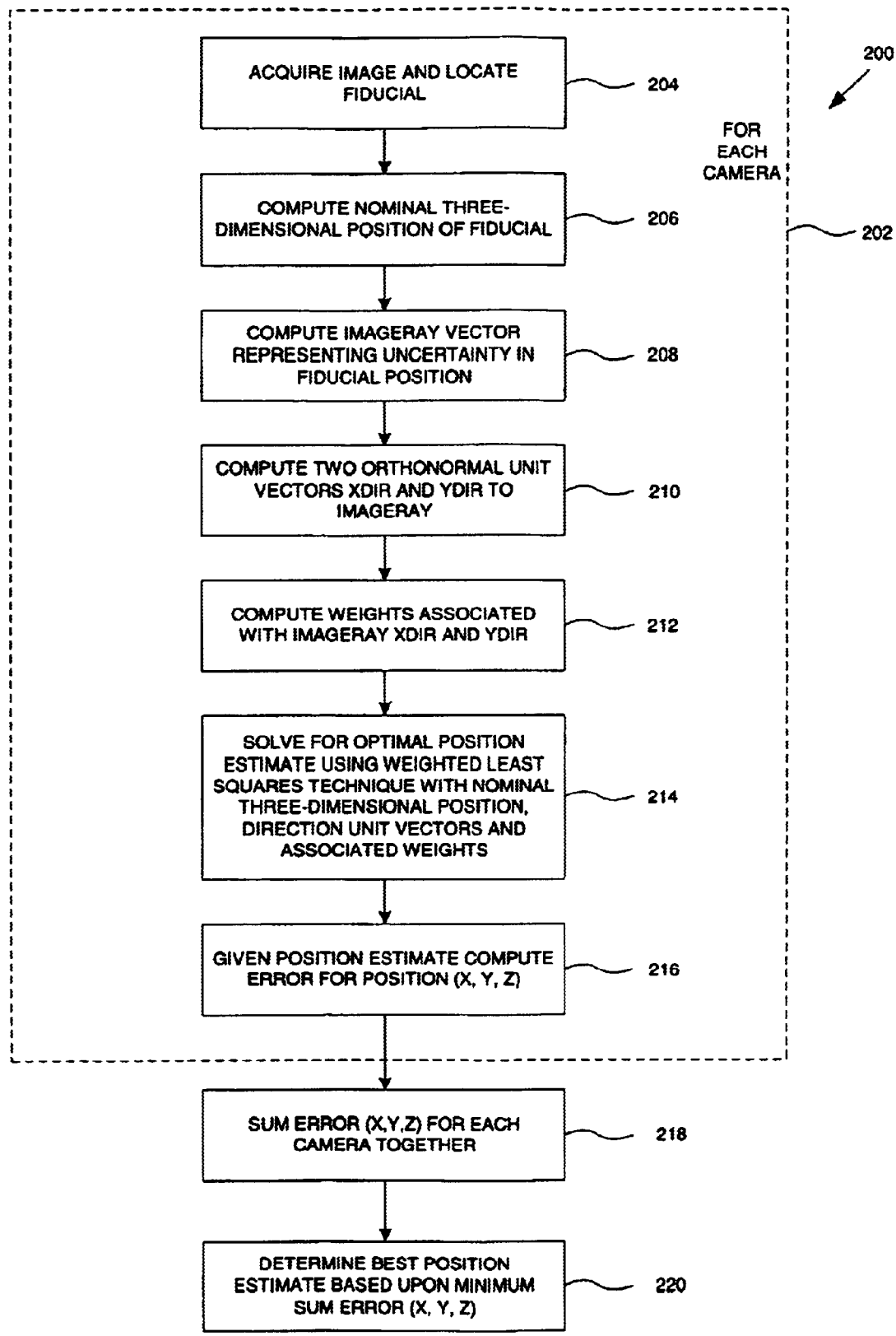
FIG. 2 is a flow diagram of a general procedure for determining the three-dimensional position of an imaged fiducial based upon two camera images of the fiducial.

Reference is now made to FIG. 2 which details a general procedure 200 for computing the three-dimensional position of a viewed fiducial using at least two spaced cameras to undertake a triangulation thereupon. The dashed-line box 202 encloses procedure steps that are accomplished for each camera 110, 112 either in succession or in a substantially simultaneous manner.

The procedure is adapted generally to combine positional information from multiple sources where that information is locations found using the search tool, which can be an RSIS tool according to a preferred embodiment.

As noted above, the cameras 110, 112 have been calibrated to a consistent frame of reference and there are transforms which map between image locations and three-dimensional locations. As used herein reference characters consisting of lower case letters to refer to image locations and CAPITAL letters to refer to corresponding three-dimensional positions.

Each camera first acquires an image containing the fiducial (step 204), and then the nominal three-dimensional position of the fiducial is computed by the search tool with respect to each camera (step 206).

Figure 3:
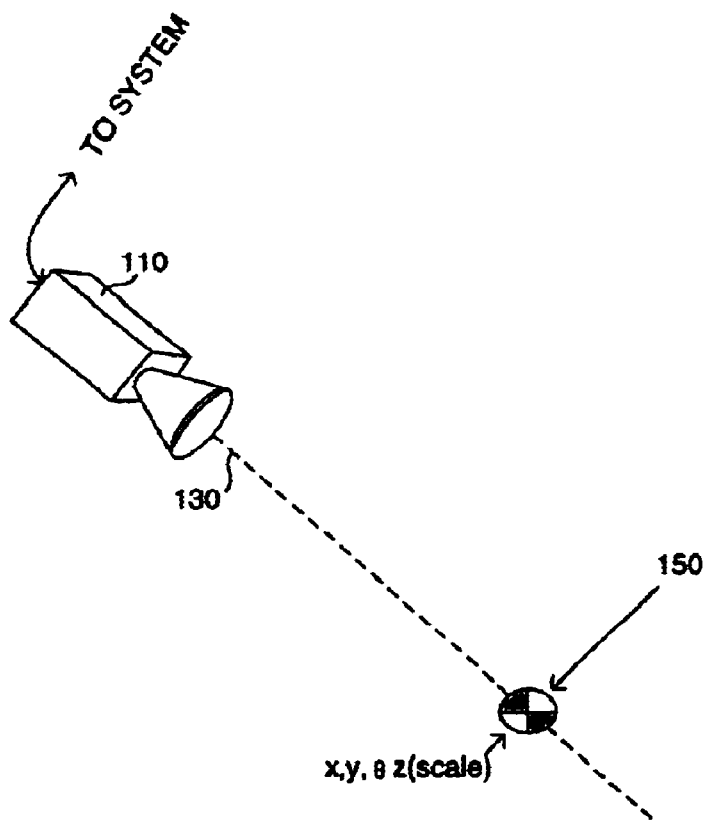
FIG. 3 is a schematic perspective view of an imaged fiducial for one camera.
Figure 4:
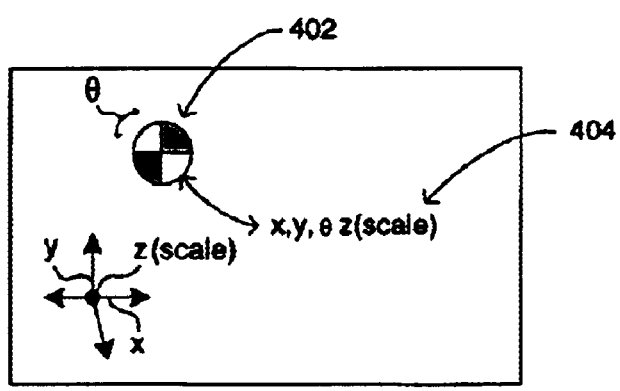
FIG. 4 is a schematic plan view of the imaged fiducial of FIG. 3 showing its located coordinates for four degrees of freedom.

Since the cameras are calibrated, there is a straightforward way to compute the nominal three-dimensional position (X, Y, θ, Z) (see FIG. 3) corresponding to the found image location (x, y, θ, z(scale)) (see coordinate set 404 in FIG. 4). Using a calibration object, the conversion from image location to nominal position and vice versa involves mapping through a transform.

The uncertainty directions relative to the nominal fiducial position (150) will correspond to the direction along the camera/image axis 130 (z(scale)), and is, therefore, termed IMAGERAY. Note that the two directions orthogonal to this direction (XDIR, YDIR).

Figure 5:
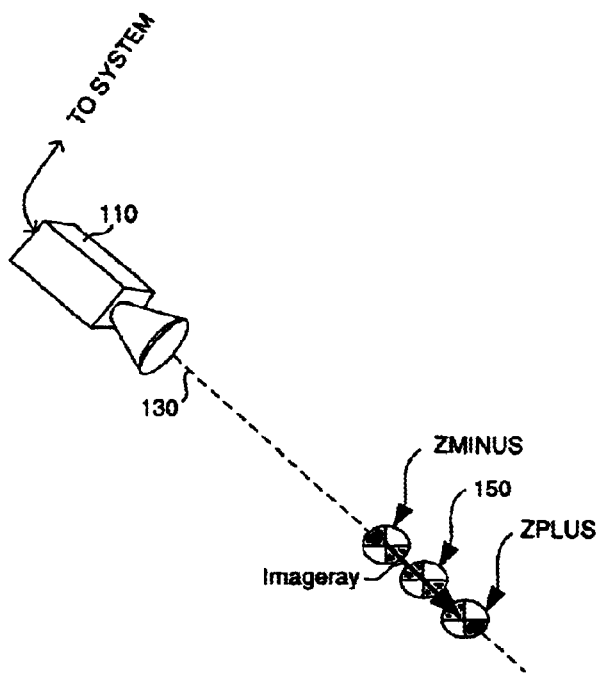
FIG. 5 is a schematic perspective view of the imaged fiducial of FIG. 3 detailing translations along a camera axis based upon predetermined applied error values.

The vector IMAGERAY is now computed in accordance with procedure step 208 and FIG. 5. The three-dimensional positions corresponding to the same (x, y) image location are computed, but with slightly different z(scale) values. In this embodiment the difference is set at ±0.1. In other words, compute the three-dimensional positions corresponding to the image locations (x, y, θ, z(scale)−0.1) and (x, y, θ, z(scale)+0.1)). The three-dimensional positions are, in particular, computed by mapping through a transform between image points and physical points computed via calibration. Therefore, taking uncertainty into account, the resulting three-dimensional fiducial positions are termed ZMINUS and ZPLUS, respectively. IMAGERAY is the difference vector between ZMINUS and ZPLUS. IMAGERAY is scaled so that it has unit length.

Note that the rotational value θ is not considered for the purposes of this solution. It is generally determined by the machine vision tool for each camera image, and averaging of the two determined rotation values can be used to produce an appropriate rotation value for the estimated three-dimensional position to be determined by the procedure of this invention. In addition, note that an object's orientation can be estimated by using the search tool orientation results to predict the position of a given point on the fiducial at x, y=1, 0 and to predict the position of a given point on the fiducial at x, y=0, 0.

Figure 6:
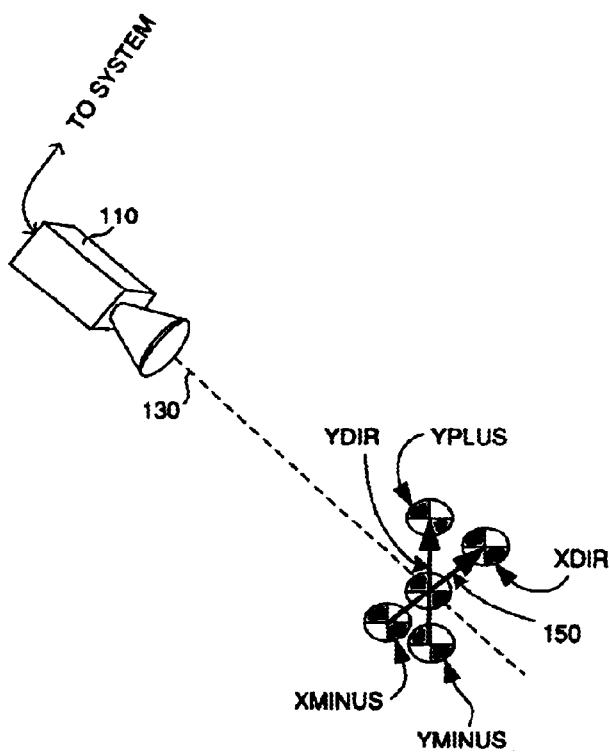
FIG. 6 is a schematic perspective view of the imaged fiducial of FIG. 3 detailing orthonormal vectors representative of predetermined error values.

Next, two unit vectors XDIR and YDIR (see FIG. 6) which are orthonormal to IMAGERAY are computed according to step 210. To compute the first vector, XDIR, use the x-axis in the image, but subtract out the component along IMAGERAY. To compute the second vector, YDIR, use the cross product of XDIR and IMAGERAY. We compute the three-dimensional vector corresponding to the x-axis in the image in the following way.

To compute XDIR, first compute the three-dimensional positions corresponding to the similar (x, y) image location, but slightly different x values. In other words, compute the three-dimensional positions corresponding to the image locations (x−0.1, y, θ, z(scale)) and (x+0.1, y, θ, z(scale)). The two resulting three-dimensional positions are termed XMINUS and XPLUS. The difference vector between XMINUS and XPLUS is termed XDIR. Projecting XDIR onto IMAGERAY produces XDIRONIMAGERAY, the non-normal component of XDIR. XDIRONIMAGERAY is then subtracted from XDIR to make XDIR normal to IMAGERAY. Finally, XDIR is scaled so that it has unit length.

As described above, the unit vector YDIR (the difference vector between positions YMINUS and YPLUS in FIG. 5), which is normal to XDIR and IMAGERAY, is computed by taking the cross product between vectors IMAGERAY and XDIR.

The procedure has now computed nominal three-dimensional positions and orthonormal three-dimensional direction unit vectors for the found image locations of the fiducial in each camera. Next, relative weights of the unit vectors for each of the cameras are specified according to step 212. The weights associated with XDIR and YDIR are usually equal, but the weight associated with IMAGERAY is usually smaller, given the greater uncertainty. The exact weightings can be determined by a variety of different statistical techniques, or by trial and error—comparing the application of a variety of weightings to the vectors and analyzing the measured accuracy of the observed results. Weights for each of the direction vectors can also be specifically modified by the score associated with each found fiducial.

As noted above, where the search tool does not register scale, the weighting given to the IMAGERAY value approaches or equals zero reflecting the prevailing high-uncertainty due to the lack of a measurement for this variable.

Given the nominal three-dimensional positions, three-dimensional direction unit vectors, and associated weights, the procedure can solve for the optimal fiducial position estimate by using weighted least squares techniques (step 214).

Given a position estimate (X, Y, Z), an "error" for this position can be computed according to how well it matches the weighted direction vectors and nominal positions (step 216). The derivation of one or more values for (X, Y, Z) is described further below.

The error between (X, Y, Z) and a nominal three-dimensional fiducial position (X, Y, Z)_nominal, and weighted three-dimensional direction unit vectors (weight (IMAGERAY), weight(XDIR), weight(YDIR)) can be computed as the sum of squares of the weighted differences as follows:

$$((X, Y, Z)-(X, Y, Z)\_nominal) \text{ dot } IMAGERAY*weight(IMAGERAY))^2 + ((X, Y, Z)-(X, Y, Z)\_nominal) \text{ dot } XDIR*weight(XDIR))^2 + ((X, Y, Z)-(X, Y, Z)\_nominal) \text{ dot } YDIR*weight(YDIR))^2$$

Likewise, the error for the position estimate (X, Y, Z) with respect to all of the cameras corresponds to the sum of the error between (X, Y, Z) and each of the cameras' nominal three-dimensional fiducial position, and weighted three-dimensional direction unit vectors, and can be computed as follows (in which variables having the suffix "_1" refer to the first camera and those having "_2" refer to the second camera) (step 218):

$$((X, Y, Z)-(X, Y, Z)\_nominal\_1) \text{ dot } IMAGERAY\_1*$$

$$weight(IMAGERAY\_1))^2 + ((X, Y, Z)-(X, Y, Z)\_nominal\_1) \text{ dot } XDIR\_1*$$

$$weight(XDIR\_1))^2 + ((X, Y, Z)-(X, Y, Z)\_nominal\_2) \text{ dot } YDIR\_1*$$

$$weight(YDIR\_1))^2 + ((X, Y, Z)-(X, Y, Z)\_nominal\_2) \text{ dot } IMAGERAY\_2*$$

$$weight(IMAGERAY\_2))^2 + ((X, Y, Z)-(X, Y, Z)\_nominal\_2) \text{ dot } XDIR\_2*$$

$$weight(XDIR\_2))^2 + ((X, Y, Z)-(X, Y, Z)\_nominal\_2) \text{ dot } YDIR\_2*$$

$$weight(YDIR\_2))^2$$

Usually, there is a single (X, Y, Z) position that has minimum sum error. This position corresponds to the best three-dimensional fiducial position estimate (step 220).

The solution to the weighted least squares equations should be clear to those of skill in the art. The above expression reduces to a second order equation in three variables (X, Y, Z). The value with minimum error will correspond to the local extrema (X, Y, Z) of this expression. The local extrema can be found by considering the three partial derivatives of this error expression: dError(X, Y, Z)/dX, dError(X, Y, Z)/dY, dError(X, Y,Z)/d Z. These three expressions are linear in X, Y, Z, and the solution can be found using linear algebra.

Note that the uses of two or more cameras herein can be made in conjunction with multiple fiducials or other patterns on a given object. The use of multiple fiducials using one or more cameras to produce multiple search tool results and accompanying transformations is described in the above-incorporated-by-reference U.S. patent application Ser. No. 09/738,564, filed on Dec. 15, 2000, filed on even date herewith, entitled SYSTEM AND METHOD FOR LOCAT- ING AN OBJECT IN THREE DIMENSIONS BASED UPON MULTIPLE FIDUCIALS USING MACHINE VISION by Aaron S. Wallack, which teachings can be used in conjunction with those of the present application.

Finally, it is expressly contemplated that a search tool adapted to register transformation of a pattern in further degrees of freedom can be employed in conjunction with the teachings of this invention. In particular, commonly owned U.S. patent application Ser. No. 09/737,836, filed on Dec. 15, 2000, entitled SYSTEM AND METHOD FOR REGISTERING PATTERNS TRANSFORMED IN SIX DEGREES OF FREEDOM USING MACHINE VISION by Aaron S. Wallack, expressly incorporated herein by reference, teaches a technique for finding and locating (registering) trained patterns/fiducials with varying values for of aspect and shear with respect to the image plane of the camera.

The foregoing has been a detailed description of a preferred embodiment of this invention. Various modifications and additions can be made without departing from the spirit and scope of the invention. For example, the placement of cameras is highly variable with respect to the fiducial to be located. The reference frames described herein for each camera are only exemplary, and different reference frames can be employed. The statistical methods used to estimate position can also be varied based upon the particular data derived with respect to each camera. In addition, more than two cameras may be employed, and greater than two search tool results can be used to estimate three-dimensional position using the principles of this invention. Selected cameras may be activated based upon the location of the fiducial with respect to the selected cameras. Scoring of the acquired image for each camera can be used to determine the best cameras to select at a particular time. Finally, the system and method of this invention can be carried out in a variety of ways including use of hardware, software or a combination of hardware and software. The procedure herein can, therefore, be characterized as a computer-readable medium having a program instruction set executed by a computer. Also, where multiple search tool results are based upon multiple camera views it is contemplated that a single camera having the capability to move between multiple locations, while viewing the same pattern can be employed, and the concept of multiple camera should be taken broadly to include multiple camera views using a single movable camera or even optics that generate multiple camera views with a single camera. Accordingly, this description is meant to be taken only by way of example, and not to otherwise limit the scope of the invention.

What is claimed is:

1. A system for estimating a three-dimensional position of an object using a machine vision system that acquires an image of the object containing a pattern that matches a trained pattern, the system comprising:

a search tool adapted to register transformation of a pattern by at least two translational degrees of freedom and at least one non-translational degree of freedom, the search tool providing, from the image based upon the trained pattern, at least a first search tool result relative to a first axis of viewing the object and a second search tool result relative to a second axis of viewing the object;

a combiner that combines the search tool results so as to determine an estimated three dimensional position of the object, the combiner being constructed and arranged to determine a first nominal coordinate position for the object along each of the at least two translational degrees of freedom and the at least one non-translational degree of freedom and a second nominal coordinate position for the object along each of the at least two translational degrees of freedom and the at least one non-translational degree of freedom, and to derive the estimated three-dimensional position of the pattern based upon combining predicted uncertainty in the first nominal coordinate position and the second nominal coordinate position by computing (a) a respective first direction unit vector along the first axis and a second direction unit vector along the second axis, each being respectively, representative of a predetermined uncertainty in the first nominal coordinate position along the first axis and the second nominal coordinate position along the second axis, and (b) a first pair of orthonornal vectors and (c) a second pair of orthonormal vectors lying within the respective image plane, each being representative of the predetermined uncertainty; and the combiner being further constructed and arranged to perform an estimation based upon matching a combination of weighted values for all of the first direction unit vector, the second direction unit vector, the first pair of orthonormal vectors and the second pair of orthonormal vectors with a selected three-dimensional position estimate so as to compute an optimal three-dimensional position estimate.

2. The system as set forth in claim 1 wherein each of the first search tool result and the second search tool result are generated from views of the object using at least a first camera and a second camera spatially separated from the first camera, respectively.

3. The system as set forth in claim 1 wherein the combiner is constructed and arranged to perform the estimation by a least squares summing so as to compute the optimal estimate based upon a minimum sum error between the combination of weighted values and the selected three-dimensional position estimate.

4. The system as set forth in claim 1 wherein the search tool comprises a search tool that registers transformation of a trained pattern by at least two translational degrees of freedom and at least two non-translational degrees of freedom.

5. A method for estimating a three-dimensional position of an object using a machine vision system that acquires an image of the object containing a pattern that matches a trained pattern, the method comprising:

providing, with a search tool adapted to register transformation of a pattern by at least two translational degrees of freedom and at least one non-translational degree of freedom, from the image based upon the trained pattern, at least a first search tool result relative to a first axis of viewing the object and a second search tool result relative to a second axis of viewing the object;

combining the search tool results so as to determine an estimated three dimensional position of the object, including determining a first nominal coordinate position for the object alone each of the at least two translational degrees of freedom and the at least one non-translational degree of freedom and a second nominal coordinate position for the object along each of the at least two translational degrees of freedom and the at least one non-translational degree of freedom, and deriving the estimated three-dimensional position of the pattern based upon combining predicted uncertainty in the first nominal coordinate position and the second nominal coordinate position by computing (a) a respective first direction unit vector along the first axis and a second direction unit vector along the second axis, each being respectively, representative of a predetermined uncertainty in the first nominal coordinate position along the first axis and the second nominal coordinate position along the second axis, and (b) a first pair of orthonormal vectors and (c) a second pair of orthonormal vectors lying within the respective image plane, each being representative of the predetermined uncertainty; and performing an estimation based upon matching a combination of weighted values for all of the first direction unit vector, the second direction unit vector, the first pair of orthonormal vectors and the second pair of orthonormal vectors with a selected three-dimensional position estimate so as to compute an optimal three-dimensional position estimate.

6. The method as set forth in claim 5 further comprising generating each of the first search tool result and the second search tool result using at least a first camera and a second camera spatially separated from the first camera, respectively.

7. The method as set forth in claim 5 wherein the step of performing the estimation includes performing a least squares summing so as to compute the optimal estimate based upon a minimum sum error between the combination of weighted values and the selected three-dimensional position estimate.

8. The method as set forth in claim 5 wherein the search tool registers transformation of a trained pattern by at least two translational degrees of freedom and at least two non-translational degrees of freedom.

9. The method as set forth in claim 8 wherein each of the at least two search tool results are derived from each of at least two respective images generated by at least two respective spatially separated cameras of a solitary instance of the trained pattern on the object.

10. A computer-readable medium including program instructions executed on a computer for estimating a three-dimensional position of an object using a machine vision system that acquires an image of the object containing a pattern that matches a trained pattern, the computer-readable medium comprising program instructions for performing the steps of:

providing, with a search tool adapted to register transformation of a pattern by at least two translational degrees of freedom and at least one non-translational degree of freedom, from the image based upon the trained pattern at least a first search tool result relative to a first axis of viewing the object and a second search tool result relative to a second axis of viewing the object;

combining the search tool results so as to determine an estimated three dimensional position of the object, including determining a first nominal coordinate position for the object along each of the at least two translational degrees of freedom and the at least one non-translational degree of freedom and a second nominal coordinate position for the object along each of the at least two translational degrees of freedom and the at least one non-translational degree of freedom, and deriving the estimated three-dimensional position of the pattern based upon combining predicted uncertainty in the first nominal coordinate position and the second nominal coordinate position by computing (a) a respective first direction unit vector along the first axis and a second direction unit vector along the second axis, each being respectively, representative of a predetermined uncertainty in the first nominal coordinate position along the first axis and the second nominal coordinate position along the second axis, and (b) a first pair of orthonormal vectors and (c) a second pair of orthonornal vectors lying within the respective image plane, each being representative of the predetermined uncertainty; and performing an estimation based upon matching a combination of weighted values for all of the first direction unit vector, the second direction unit vector, the first pair of orthonormal vectors and the second pair of orthonormal vectors with a selected three-dimensional position estimate so as to compute an optimal three-dimensional position estimate.

11. The computer-readable medium as set forth in claim 10 further comprising generating each of the first search tool result and the second search tool result using at least a first camera and a second camera spatially separated from the first camera, respectively.

12. The computer-readable medium as set forth in claim 10 wherein the step of performing the estimation includes performing a least squares summing so as to compute the optimal estimate based upon a minimum sum error between the combination of weighted values and the selected three-dimensional position estimate.

13. The computer-readable medium as set forth in claim 10 wherein the search tool registers transformation of a trained pattern by at least two translational degrees of freedom and at least two non-translational degrees of freedom.

14. The computer-readable medium as set forth in claim 10 wherein each of the first search tool result and the second search tool result are derived from each of at least two respective images generated by at least two respective spatially separated cameras of a solitary instance of the trained pattern on the object.

* * * * *